No. 810,555. PATENTED JAN. 23, 1906.
W. J. NEWMAN.
TRIPPING APPARATUS.
APPLICATION FILED APR. 10, 1905.
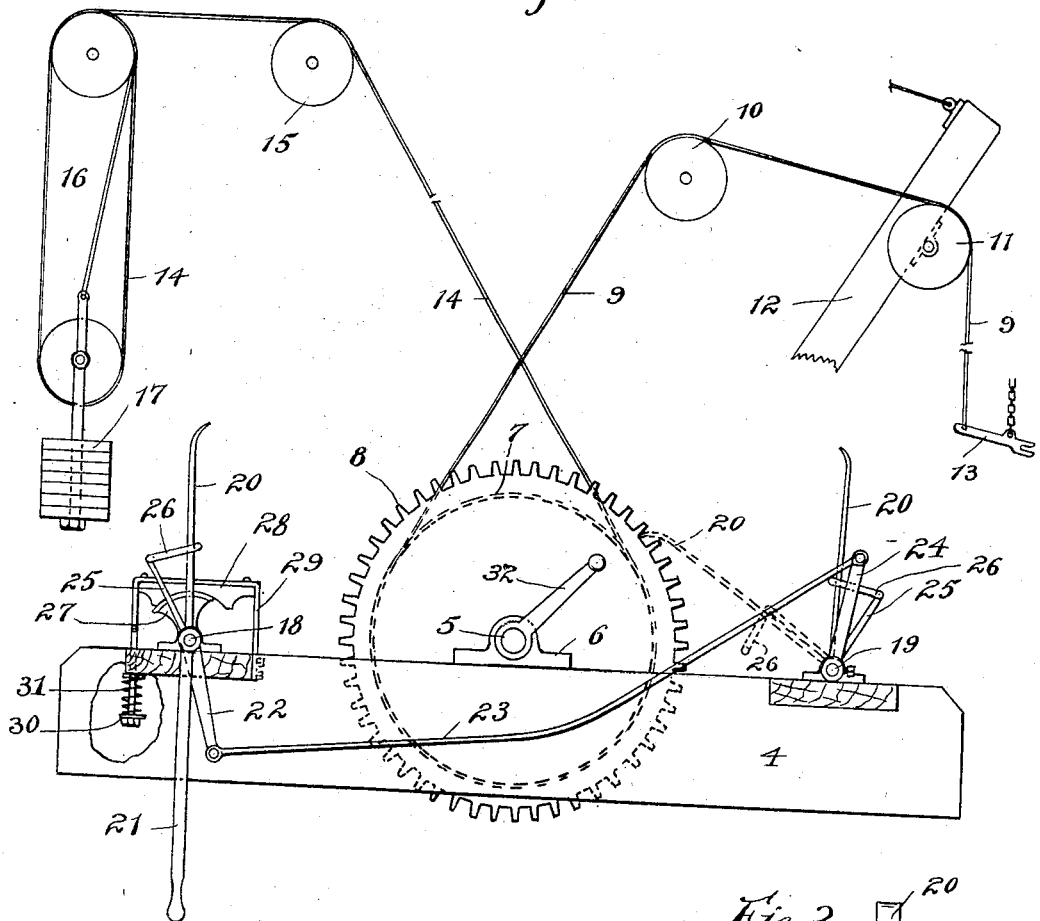
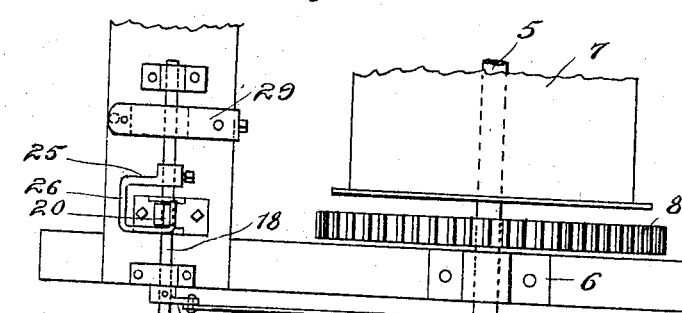
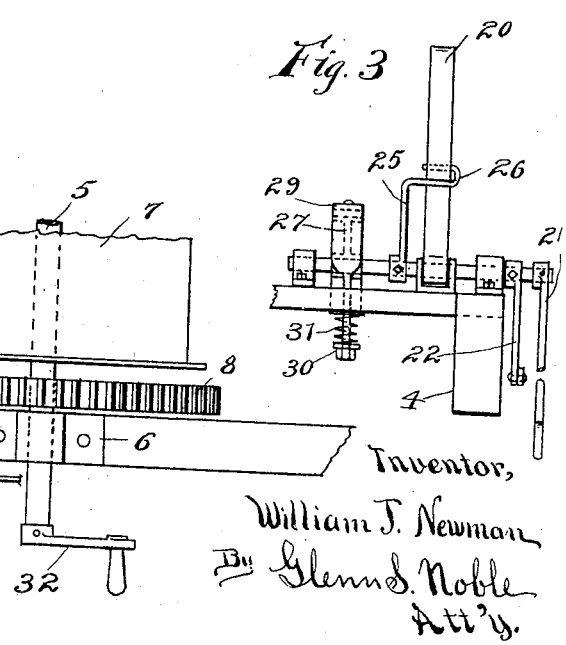
Inventor,
William J. Newman
By Glenn S. Noble
Att'y.
Witnesses:

UNITED STATES PATENT OFFICE.

WILLIAM J. NEWMAN, OF CHICAGO, ILLINOIS.

TRIPPING APPARATUS.

No. 810,555.   Specification of Letters Patent.   Patented Jan. 23, 1906.

Application filed April 10, 1905. Serial No. 254,752.

*To all whom it may concern:*

Be it known that I, WILLIAM J. NEWMAN, a citizen of the United States, residing at Chicago, in the county of Cook and State of Illinois, have invented certain new and useful Improvements in Tripping Apparatus, of which the following is a specification.

This invention relates particularly to a tripping apparatus for tripping dump-boxes, such as shown in Letters Patent No. 731,118, issued to me June 16, 1903, for shovels, scoops, or other equivalent devices. In handling such dumping-receptacles with derricks or the like it is desirable that the operator be provided with means whereby he can dump the load at any time desired, and this invention furnishes means for this purpose. Its objects are to provide a simple and efficient tripping apparatus of the character set forth and which consists in the novel features and details of construction, which will be described and claimed hereinafter.

In the accompanying drawings, illustrating this invention, Figure 1 is a side elevation of a tripping device embodying this invention, parts being shown diagrammatically and other parts being broken away for convenience in illustration. Fig. 2 is a top plan view of a portion of the apparatus shown in Fig. 1, and Fig. 3 is an end elevation showing the locking-pawl at the left-hand side of Fig. 1 and its connected parts.

As shown in Fig. 1, 4 represents a frame of any suitable construction, which is preferably arranged in the derrick-house adjacent to the hoisting-engine, so that the apparatus may be operated by the engineer. A shaft 5, mounted in bearings 6 on the frame 4, carries a winding-drum 7 and a toothed wheel 8. The winding-drum is for the purpose of winding up and playing out the trip-line 9, which is rove around the same and extends over suitable guide-sheaves 10 and 11, which may be conveniently arranged on the derrick-post and the boom 12, respectively, or in any other convenient manner, depending upon the nature of the work being done for the device to be operated. The outer end of the trip-line is connected to a trip-lever or releasing device 13, which is shown to represent the tripping-lever of the patent above referred to, but which is intended to represent in general any tripping or releasing device. A second line 14 is rove around the drum in the opposite direction from the line 9 and then passes up and over a suitable guide-sheave 15 and terminates in a block and tackle 16, which carries a weight 17. The block and tackle is arranged so that the weight 17 will only need to travel a short distance to take up a considerable amount of slack of the trip-line 9. It is evident that other differential means could be used for this purpose; but I have found this arrangement to be satisfactory in actual practice. Suitably mounted on the frame 4, at either side of the shaft 5 and parallel thereto, are rods or shafts 18 and 19, carrying locking-pawls 20, which are loosely pivoted thereon and which are adapted to engage with the toothed wheel 8 to lock said wheel and the drum in any desired position. The shaft 18 is provided with a handle 21, by means of which it may be rotated by the operator, and is also provided with an arm 22, which connects with a rod 23, having its opposite end engaging with an arm 24, secured on the shaft 19. The arrangement is such that a movement of the lever 21 will turn the shaft 18 in one direction, and the connecting-rod and arms will cause the shaft 19 to turn in the opposite direction. In some instances the pawls 20 might be rigidly secured to the shafts, so that they would be positively thrown into engagement with the toothed wheel; but I prefer to use the actuating-arms 25 for operating the pawls or dogs 20. These arms are rigidly and adjustably secured to the shafts 18 and 19, adjacent to the pawls 20, and are bent at their outer ends around said pawls, as shown at 26, so that they embrace the same, but allow a limited amount of play for the pawls. The shaft 18 is also provided with a brake which consists of a segment 27, rigidly secured thereto and provided with a brake-shoe 28, which is carried by spring or yielding strip 29. This spring is attached at one end to the cross-piece of the frame and at the other end is reduced to form a rod which passes through the cross-piece and is provided at its lower end with a nut and washer 30. A spring 31 is inserted between the nut and washer and the frame-piece and provides means for giving an adjustable tension on said brake. This brake is sufficient to hold the shaft 18 and the connected shaft 19, with their various attachments, in any adjusted position.

The operation of this tripping apparatus will be readily understood from the above description and the drawings and is as follows: The box or receptacle to be dumped is raised by the derrick or other device in any well-known manner and is swung around to position to be dumped. The trip-line will play out or wind up as the dumping-receptacle is raised or lowered, the counterweight and line being just sufficient to keep the trip-line tight at all times; but the weight is not sufficient to trip the box. As the dumping-box is lowered to position for discharging the operator throws the handle 21, which turns the shaft 18 and, through the connecting devices, the shaft 19 until the actuating-arms 25 throw the pawls 20 in toward the toothed wheel 8. The pawls 20 engage with the wheel 8 and rigidly lock the same from turning in either direction, the actuating-arms 25 moving through a greater arc until the outer sides of the loop portion 26 rest against the pawls. As the load continues to descend the trip-rope 9 will pull up the locking catch or arm 13 to release the bottom of the box or other device which is being used. When the load is discharged, the dogs 20 are released by swinging the handle 21 in the opposite direction until the actuating-arms 25 raise the dogs to their inoperative position. The trip-line 9 is then free to be wound up by the counterweight and its line as the dump-box is again raised or will play out as the dump-box is lowered.

If at any time it becomes necessary or desirable to play out the line 9 or wind the same up other than normally during its automatic action, the shaft 5 is provided with a crank or equivalent turning device 32, by means of which the drum 7 may be turned in either direction.

Having thus described my invention, which I do not wish to limit to the exact details of construction herein shown and described, what I claim, and desire to secure by Letters Patent, is—

1. In a tripping apparatus of the character set forth, the combination of a drum, a trip-line adapted to be wound on said drum, means for revolving said drum to take up slack in said trip-line, and means for positively and unyieldingly stopping said drum to cause the trip-line to actuate the tripping device.

2. In a tripping apparatus of the character set forth, the combination of a drum, a trip-line adapted to be wound around said drum in one direction, a take-up line adapted to be wound around the drum in the direction opposite to said trip-line, means for giving a tension to said take-up line, and means for positively and unyieldingly locking said drum to prevent its revolving in either direction.

3. In a tripping apparatus, the combination of a drum, a trip-line adapted to be wound around said drum in one direction, a take-up line adapted to be wound around said drum in the opposite direction, said take-up line being wound through suitable blocks, a weight connected with one of said blocks to give said take-up line sufficient tension to take up the slack in the trip-line, a toothed wheel mounted with said drum and pawls adapted to be thrown into engagement with said toothed wheel.

4. The combination of a drum, a trip-line, a tension-line, means for producing tension in the latter line, a toothed wheel mounted with said drum, pawls on either side of said toothed wheel, and means for throwing said pawls simultaneously into and out of engagement with said wheel.

5. The combination with a drum for a trip-line, of a toothed wheel mounted with said drum and adapted to rotate therewith, pawls adapted to engage with said toothed wheel, shafts on which said pawls are mounted, means for turning one of said shafts, and means connecting between said shafts whereby they will be turned simultaneously.

6. The combination of a trip-line drum, a shaft on which said drum is mounted, a ratchet-wheel on said shaft, pawl-shafts mounted adjacent to said drum-shaft, means for turning one of said pawl-shafts, means for causing the other shaft to be turned simultaneously with the first-named shaft, pawls loosely mounted on said shafts and actuating-levers on said shafts adapted to throw said pawls into and out of engagement with the ratchet-wheel.

7. The combination of a ratchet-wheel, a shaft adjacent to said ratchet-wheel, a pawl loosely mounted on said shaft and adapted to engage with said ratchet-wheel, an actuating-lever on said shaft for throwing said pawl into and out of engagement, the arrangement being such that the actuating-lever will have a certain amount of play before throwing the pawl, and means for turning the shaft on which said pawl and actuating-lever are secured.

8. The combination of a ratchet-wheel, a shaft adjacent to said ratchet-wheel, a pawl on said shaft adapted to engage with said ratchet-wheel, means for manually turning said shaft and a brake for holding said shaft in adjusted position.

9. The combination of a trip-line drum, a shaft on which said drum is mounted, a crank for turning said shaft, a toothed wheel on said shaft, pawl-shafts mounted adjacent to said drum-shaft and substantially parallel therewith, pawls loosely mounted on said shafts, actuating-levers secured to said shafts for throwing said pawls, arms extending from said shafts in opposite directions, a rod connecting between the ends of said arms, a handle for turning one of said shafts, and an adjustable brake on one of said shafts.

WILLIAM J. NEWMAN.

Witnesses:
M. C. SIKTBERG,
T. J. PETERSON.